US011999182B2

(12) United States Patent
Hu et al.

(10) Patent No.: US 11,999,182 B2
(45) Date of Patent: Jun. 4, 2024

(54) INSTRUMENT COMPONENT ORGANIZER

(71) Applicant: AGILENT TECHNOLOGIES, INC., Santa Clara, CA (US)

(72) Inventors: Shaouhan Hu, Hamburg (DE); Daniela Loraing, Ettlingen (DE); Olga Schikurski, Ettlingen (DE); Sascha Lege, Bühl (DE); Stephan Buckenmaier, Bad Herrenalb (DE)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 216 days.

(21) Appl. No.: 17/372,093

(22) Filed: Jul. 9, 2021

(65) Prior Publication Data

US 2023/0011549 A1 Jan. 12, 2023

(51) Int. Cl.

| | |
|---|---|
| ***B65D 27/04*** | (2006.01) |
| ***B42F 5/00*** | (2006.01) |
| ***B42F 7/02*** | (2006.01) |
| ***B42F 21/00*** | (2006.01) |
| ***B65D 27/22*** | (2006.01) |
| *B42F 1/00* | (2006.01) |

(52) U.S. Cl.

CPC ................ *B42F 7/025* (2013.01); *B42F 5/00* (2013.01); *B42F 21/00* (2013.01); *B65D 27/04* (2013.01); *B65D 27/22* (2013.01); *B42F 1/00* (2013.01); *B42P 2221/06* (2013.01); *B65D 2203/00* (2013.01)

(58) Field of Classification Search

CPC .. B42F 7/025; B42F 5/00; B42F 21/00; B42F 1/00; B65D 27/04; B65D 27/22; B65D 2203/00; B42P 2221/06

USPC ........................................................ 229/68.1

See application file for complete search history.

(56) References Cited

U.S. PATENT DOCUMENTS

| | | | | |
|---|---|---|---|---|
| 1,496,335 A * | 6/1924 | Bennett | B42F 13/04 | 402/8 |
| 4,429,793 A * | 2/1984 | Ehmann | A61M 5/003 | 62/457.2 |
| 4,744,689 A | 5/1988 | Sternberg | | |
| 4,813,710 A * | 3/1989 | Weilgart | B42F 21/00 | 283/37 |
| 4,822,017 A * | 4/1989 | Griesmyer | B41J 13/24 | 271/275 |

(Continued)

FOREIGN PATENT DOCUMENTS

| | | |
|---|---|---|
| CN | 209289998 | 8/2019 |
| DE | 60010566 T2 | 5/2005 |

(Continued)

OTHER PUBLICATIONS

German Patent Office, "Search Report for application DE102022116793.3", dated Jul. 5, 2023, 10 pages.

*Primary Examiner* — Peter N Helvey

(74) *Attorney, Agent, or Firm* — Mannava & Kang, P.C.; Adesh Bhargava

(57) ABSTRACT

In some examples, an organizer may include a plurality of inserts. At least one insert of the plurality of inserts may include at least a front panel and an opposite back panel that form the at least one insert, and at least one instrument component disposed hi the at least one insert. The organizer may further include a binding mechanism that attaches the plurality of inserts.

14 Claims, 12 Drawing Sheets

(56) References Cited

U.S. PATENT DOCUMENTS

| | | | | | |
|---|---|---|---|---|---|
| 5,077,001 | A * | 12/1991 | Makowka | B65D 27/30 383/88 |
| 5,377,733 | A * | 1/1995 | Halley | B42F 5/00 150/147 |
| 5,501,540 | A * | 3/1996 | Ho | B42F 5/00 281/38 |
| 5,632,113 | A * | 5/1997 | Raymond | A01K 97/06 43/57.1 |
| 5,833,330 | A * | 11/1998 | Kos | A61B 50/10 206/570 |
| 6,109,812 | A | 8/2000 | Welch | |
| 6,155,738 | A * | 12/2000 | King | G09F 5/04 281/31 |
| 6,196,749 | B1 | 3/2001 | Chizmar | |
| 6,371,678 | B1 | 4/2002 | Chizmar | |
| 6,702,501 | B2 | 3/2004 | Chizmar | |
| 7,347,640 | B2 | 3/2008 | Chizmar | |
| 7,926,850 | B1 * | 4/2011 | Muncy | B42F 13/26 283/67 |
| 7,967,139 | B2 * | 6/2011 | Brinker | A61B 50/30 206/472 |
| 8,083,429 | B2 | 12/2011 | Grassia | |
| 8,485,750 | B2 | 7/2013 | Baker et al. | |
| 8,585,311 | B2 | 11/2013 | Brennan et al. | |
| 8,591,135 | B2 | 11/2013 | Baker et al. | |
| 9,537,528 | B1 * | 1/2017 | Harper | H04M 1/04 |
| 9,902,190 | B2 | 2/2018 | Hobbs | |
| 10,618,342 | B2 | 4/2020 | Witter | |
| 10,759,215 | B1 | 9/2020 | Orr | |
| 11,685,574 | B2 * | 6/2023 | Jobe | B65D 81/03 229/80 |
| 2001/0045737 | A1 | 11/2001 | Hudkins | |
| 2006/0131206 | A1 * | 6/2006 | Kenney | A61B 50/31 206/570 |
| 2007/0183840 | A1 | 8/2007 | Graff et al. | |
| 2008/0141700 | A1 * | 6/2008 | Fuchs | F25D 3/08 206/570 |
| 2008/0232720 | A1 | 9/2008 | Karagiannis | |
| 2013/0256171 | A1 * | 10/2013 | Kerdemelidis | A61F 15/001 206/476 |
| 2015/0250676 | A1 * | 9/2015 | Galvin | A61J 1/00 53/474 |
| 2018/0086132 | A1 | 3/2018 | Moore | |

FOREIGN PATENT DOCUMENTS

| | | | |
|---|---|---|---|
| GB | 2589127 | A | 5/2021 |
| WO | 2017020049 | | 2/2017 |

* cited by examiner

INSTRUMENT COMPONENT ORGANIZER

BACKGROUND

In various product design, development, manufacturing, utilization, and maintenance environments, different devices may need to be utilized as a component of, or otherwise for a machine, an instrument, or another type assembly. For example, different devices may need to be utilized in a sequence that is specific to the machine, the instrument, or the assembly, or for any other purpose associated with the machine, the instrument, or the assembly. An example of a device may include an instrument component for an instrument. Typically, the devices may be provided to a user, such as a field service engineer, or a non-trained person, and the user may access the devices as needed to perform one or more operations associated with the machine, the instrument, or the assembly. In this regard, it is technically challenging to access the devices in an efficient and accurate manner, particularly when several devices are needed in a specified sequence, or otherwise, for the machine, the instrument, or the assembly.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
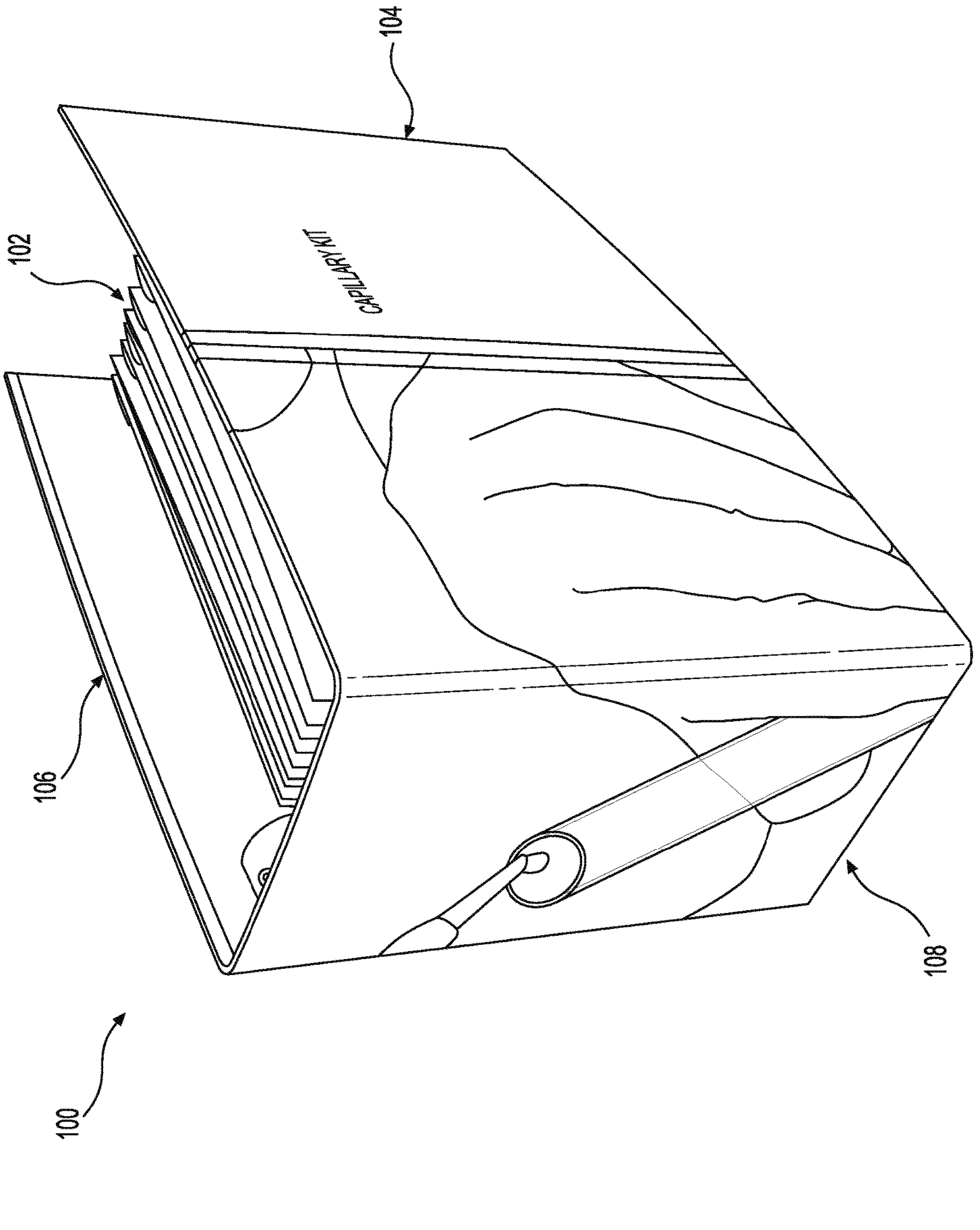
FIG. 1 illustrates a perspective view of an instrument component organizer, in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms “a” and “an” are intended to denote at least one of a particular element. As used herein, the term “includes” means includes but not limited to, and the term “including” means including but not limited to. The term “based on” means based at least in part on.

As disclosed herein, in various product design, development, manufacturing, utilization, and maintenance environments, different devices may need to be utilized as a component of, or otherwise for a machine, an instrument, or another type assembly. For example, different devices may need to be utilized in a sequence that is specific to the machine, the instrument, or the assembly, or for any other purpose associated with the machine, the instrument, or the assembly. An example of a device may include an instrument component such as a chromatography instrument component for an instrument such as a liquid chromatography instrument. Other examples of instruments may include gas chromatography instruments, mass spectrometry instruments, etc. In general, the instrument may include any instrument where a user may need to be guided to remove or install an instrument component, or service an instrument generally. An example of a chromatography instrument component may include a capillary, a seal, a check valve, an inline filter, a needle or seat in an autosampler, and any other components generally of a chromatography instrument.

For the example of the chromatography instrument component that includes a capillary, typically, the capillaries may be provided to a user, for example, as loose packages, and the user may access the capillaries as needed, for example, by randomly selecting one of the loose packages to perform one or more operations associated with the liquid chromatography instrument. In this regard, it is technically challenging to access the capillaries, or devices generally, in an efficient and accurate manner, particularly when several capillaries are needed in a specified sequence for an instrument, such as the liquid chromatography instrument. It is also technically challenging to accurately determine how to correctly connect the capillaries, or devices generally, to an instrument such as the liquid chromatography instrument.

In order to address at least the aforementioned technical challenges, an instrument component organizer (hereinafter also referred to as “organizer”) is disclosed herein and may include a plurality of inserts. The inserts may be shaped in the form of an envelope, or include another type of configuration. The inserts may also be denoted as “loose-leaf” inserts.

According to examples disclosed herein, the organizer may be in the form of an open or enclosed folder, a container, or another shape that may be used to securely retain instrument components disposed in the inserts. The instrument components may be retained in the inserts, for example, for transport, storage, and/or shipment of the instrument components.

According to examples disclosed herein, the inserts may be formed of a variety of materials, such as paper, plastic, composite, and other types of materials. In some examples, the inserts may be stretchable to facilitate retention of an instrument component by partially deforming around the instrument component disposed therein.

According to examples disclosed herein, an instrument component may be fixed directly onto a base insert by using a fastening mechanism such as tie wrap, cable tie, rubber band or other elastic strip, tape, sticky material, wire, custom formed and bent paperboard cutout, and/or textile or other strap or clip mechanism (instead of using a sleeve).

The at least one insert of the plurality of inserts may include at least a front panel and an opposite back panel that form the at least one insert, and at least one instrument component disposed in the at least one insert. In some examples, the instrument component may include a chromatography instrument component for an instrument such as a liquid chromatography instrument.

The organizer may further include a binding mechanism that removably attaches the plurality of inserts. The binding mechanism may hingedly couple the plurality of inserts. In some examples, the binding mechanism may include at least one ring that attaches the plurality of inserts. In other examples, the binding mechanism may be in the form of a hinged binder, a loop fastener, a slide-in locking binder, or another type of binder.

The binding mechanism may include a spine that includes a width that is greater than or equal to a maximum thickness of the plurality of inserts including instrument components that include the at least one instrument component. In this manner, the spine may protect the instrument components from compression or other such forces that may negatively affect the integrity of the instrument components.

The front panel of the at least one insert of the plurality of inserts may include a window to permit insertion or removal of the at least one instrument component. In some examples, the window may include a perforated opening to permit the insertion or the removal of the at least one instrument component. Alternatively or additionally, the window may include a transparent layer for visualization of information associated with the at least one instrument component. The information may be printed or otherwise labeled (e.g., by an attachment) onto the insert. Customarily, the window may include a generally quadrilateral configuration. In this regard, an opening adjacent to one side of the quadrilateral configuration may permit the insertion or the removal of the at least one instrument component. In some examples, the information may include installation, removal, maintenance, or any type of information related to the at least one instrument component.

A code on the front panel and/or the back panel of the at least one insert of the plurality of inserts may provide information associated with the at least one instrument component. The code may include any type of code, such as a quick response (QR) code, a bar code, or another type of code. A user of the organizer may scan or otherwise utilize the code to view the information associated with the at least one instrument component.

A visual display on the front panel and/or the back panel of the at least one insert of the plurality of inserts may indicate a position of the at least one instrument component relative to an instrument that utilizes the at least one instrument component. In some examples, the visual display may include text, graphical, or other types of information to indicate a position, operation instructions, and/or instructional illustrations of the at least one instrument component relative to an instrument that utilizes the at least one instrument component. For instance, for the example of the devices that include capillaries, the visual display may Include a display of an exact connection point for each capillary onto the liquid chromatography instrument.

A front cover and a back cover of the organizer may at least partially enclose the plurality of inserts. In this manner, the front cover and the back cover may protect the instrument components from forces that may negatively affect the integrity of the instrument components.

A flap of an insert may extend from the front panel or the back panel, and is insertable in a slot in the other one of the front panel or the back panel to close the at least one insert. The flap, when inserted in the slot, may securely enclose the instrument components in the insert for secure transport and/or storage by a user of the organizer.

According to examples disclosed herein, the at least one instrument component may be disposed in a package that is inserted in the at least one insert. In this manner, the package, including the instrument component therein, may be readily inserted in the insert without the need for a user to directly contact the instrument component. The package, including the instrument component therein, may also protect the instrument component from contaminants, and other such factors.

According to examples disclosed herein, the organizer may include a hook for hanging the organizer from objects for more convenient handling.

According to examples disclosed herein, the at least one insert may include a tab to identify and/or index a location of the at least one insert relative to the plurality of inserts. The tab may include any type of indicator (e.g., textual, graphical, etc.) to indicate, for example, a position of the insert and/or the instrument component relative to other inserts and/or instrument components. Alternatively or additionally, the tab may identify the instrument component, and the identification may be used in a further process to utilize the instrument component.

According to examples disclosed herein, the binding mechanism may attach the plurality of inserts in a specified sequence based on utilization of instrument components disposed in the plurality of inserts, a random sequence, or a sequence that is independent of the utilization of the instrument components disposed in the plurality of inserts. The specified sequence of the plurality of inserts may be based on a specified utilization order of instrument components in an associated instrument. The random sequence of the plurality of inserts may be based on the need to secure the instrument components in the organizer, independent of the utilization order of instrument components in an associated instrument. With respect to the sequence that is independent of the utilization of the instrument components disposed in the plurality of inserts, the independent sequence of the plurality of inserts may include, for example, an alphabetical, a numerical, or another such sequence.

According to examples disclosed herein, a method is disclosed herein and may include placing at least one instrument component in at least one insert of a plurality of inserts. The at least one insert may include at least a front panel and an opposite back panel that form the at least one insert. The method may further include forming an organizer by attaching, by using a binding mechanism, the plurality of inserts. In this regard, placing the at least one instrument component in the at least one insert of the plurality of inserts may further include inserting the at least one instrument component in a window of the at least one insert of the plurality of inserts. The method may further include placing a visual display on the front panel of the at least one insert of the plurality of inserts to provide a position of the at least one instrument component relative to an instrument that utilizes the at least one instrument component.

The instrument component organizer is described in further detail with reference to FIGS. 1-9.

Figure 2:
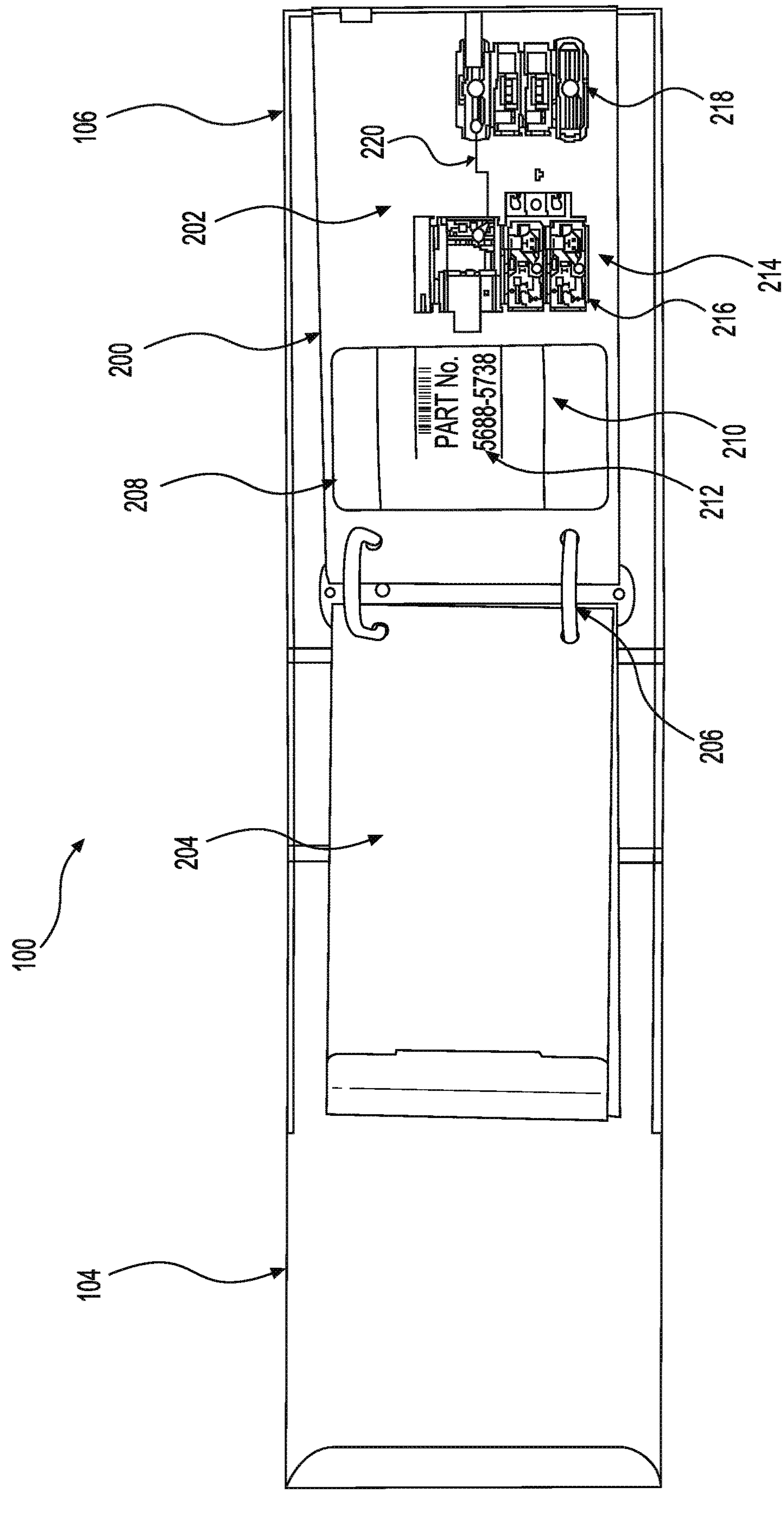
FIG. 2 illustrates a front view of the instrument component organizer of FIG. 1 in an open configuration, and a front view of an insert included in the instrument component organizer, in accordance with an example of the present disclosure.
Figure 3:
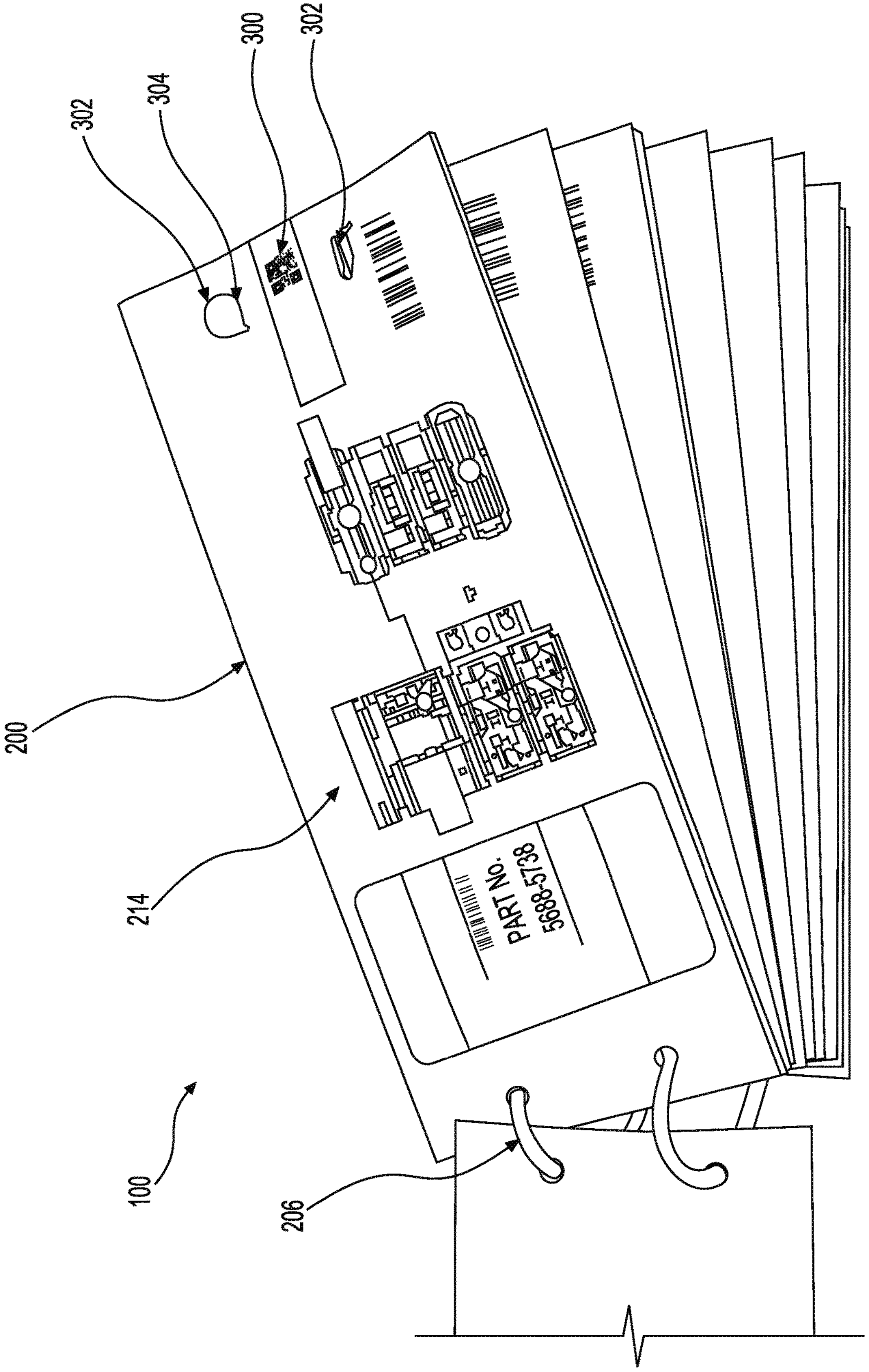
FIG. 3 illustrates a front view of a plurality of inserts of the instrument component organizer of FIG. 1, in accordance with an example of the present disclosure.
Figure 4:
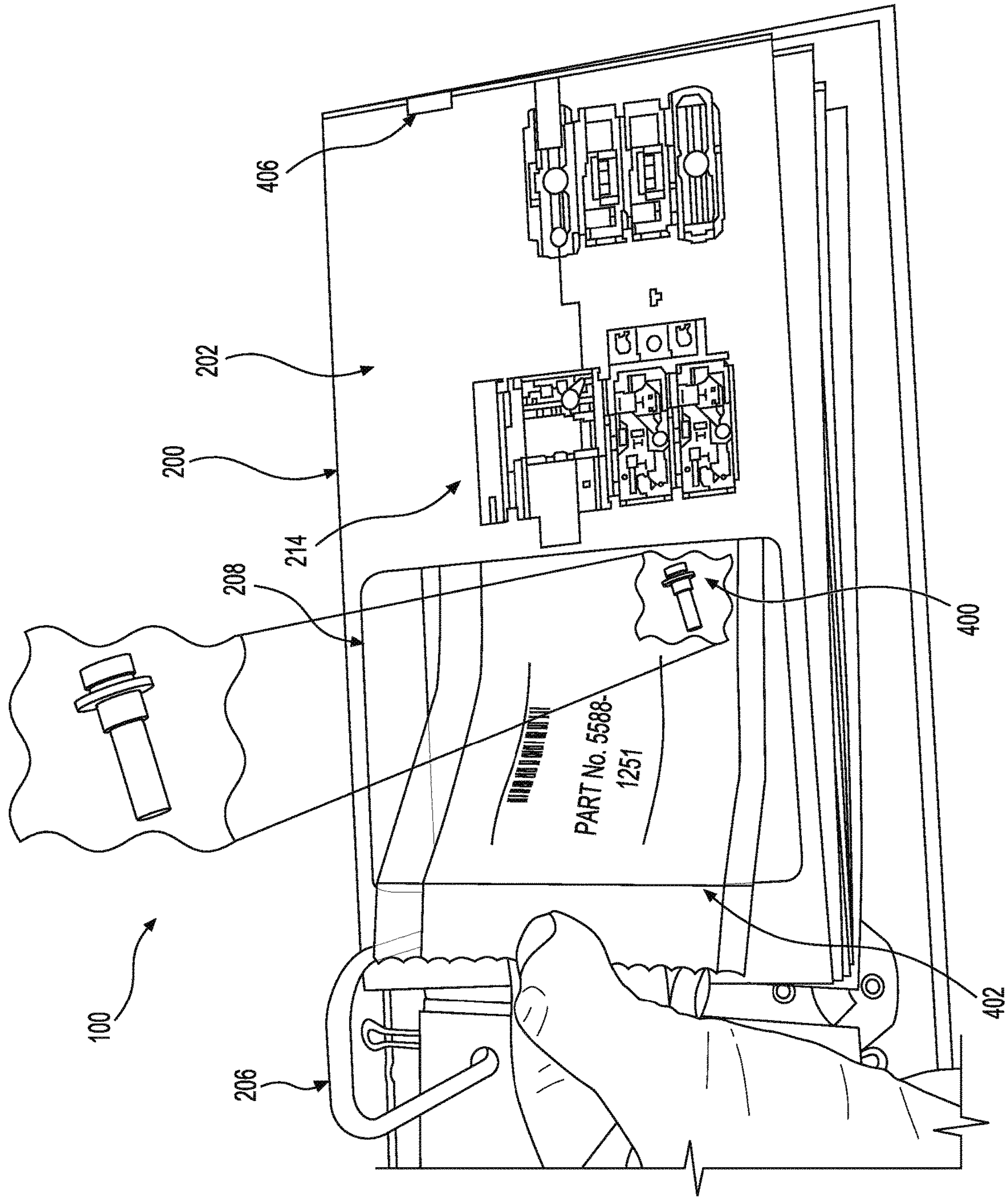
FIG. 4 illustrates another front view of a plurality of inserts of the instrument component organizer of FIG. 1, illustrating insertion of a package in an opening of a window of an insert, in accordance with an example of the present disclosure.
Figure 5:
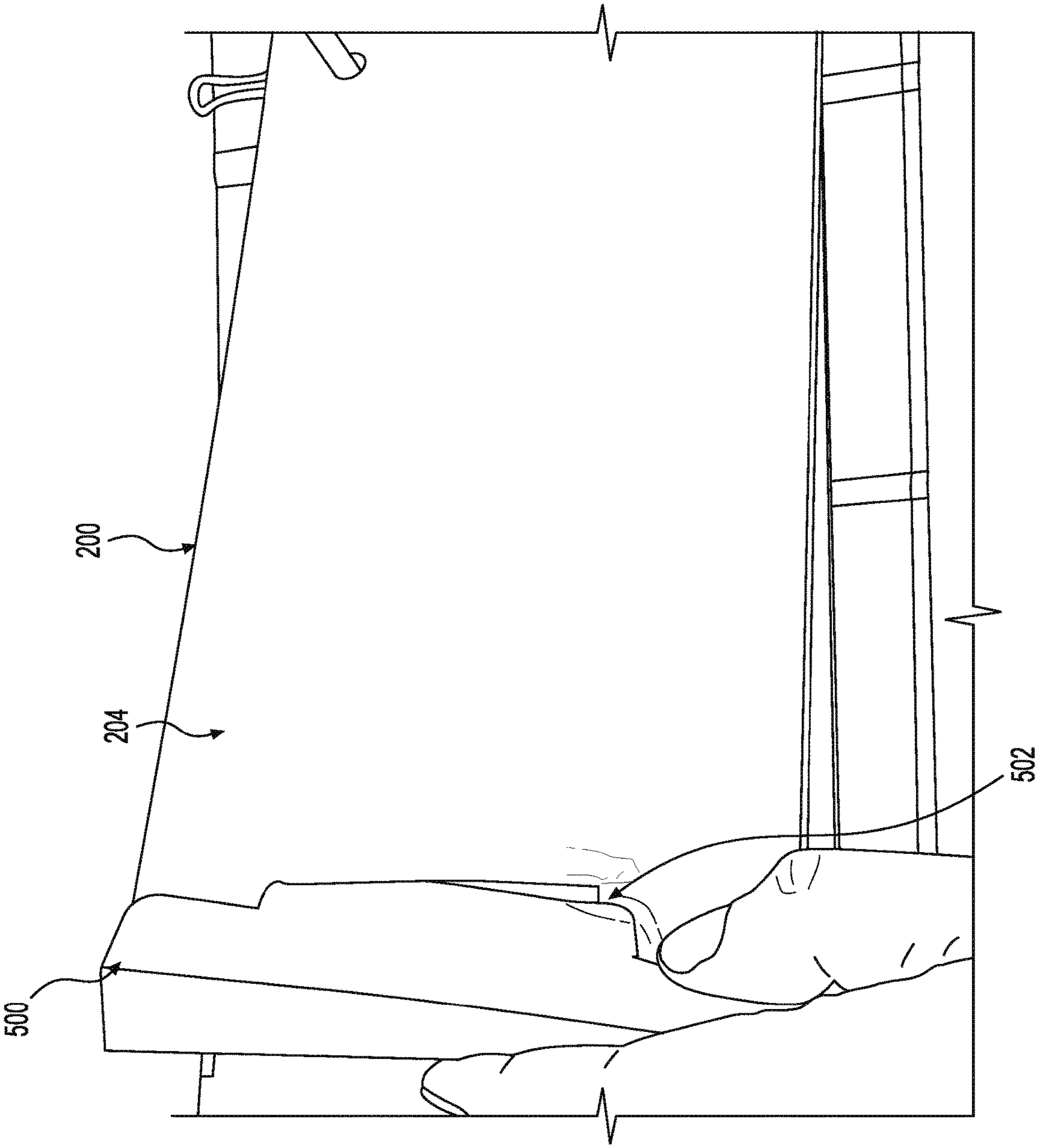
FIG. 5 illustrates a back view of an insert of the instrument component organizer of FIG. 1, illustrating closing of the insert by using a flap that is insertable in a slot. In accordance with an example of the present disclosure.

Specifically, FIG. 1 illustrates a perspective view of an instrument component organizer (hereinafter "organizer 100"), in accordance with an example of the present disclosure, FIG. 2 illustrates a front view of the organizer 100 in an open configuration, and a front view of an insert included in the organizer 100, in accordance with an example of the present disclosure. FIG. 3 illustrates a front view of a plurality of inserts of the organizer 100, in accordance with an example of the present disclosure. FIG. 4 illustrates another front view of a plurality of inserts of the organizer 100, illustrating insertion of a package in an opening of a window of an insert, in accordance with an example of the present disclosure. FIG. 5 illustrates a back view of an insert of the organizer 100, illustrating closing of the insert by using a flap that is Insertable in a slot, in accordance with an example of the present disclosure.

Referring to FIGS. 1-5, the organizer 100 may include a plurality of inserts 102. At least one insert 200 (e.g., see FIG. 2) of the plurality of inserts 102 may include at least a front panel 202 and an opposite back panel 204 that form the at least one insert 200. As disclosed herein, the inserts 102 may be shaped in the form of an envelope, or include another type of configuration.

At least one instrument component 400 (e.g., see FIG. 4) may be disposed in the at least one insert 200. Generally, at least one device may be disposed in the at least one insert 200. The instrument components may be retained in the inserts 102, for example, for transport, storage, and/or shipment of the instrument components.

A binding mechanism 206 may attach the plurality of inserts. The binding mechanism may hingedly couple, as shown in FIGS. 2-4, the plurality of inserts 102. In some examples, as shown in FIGS. 2-4, the binding mechanism may include at least one ring, such as two rings that attach the plurality of inserts 102. In other examples, the binding mechanism may be in the form of a hinged binder, a loop fastener, a slide-in locking binder, or another type of binder.

According to examples disclosed herein, the binding mechanism 206 may include a spine 108 that includes a width that is greater than or equal to a maximum thickness of the plurality of inserts 102 including instrument components that include the at least one instrument component. In this manner, the spine 108 may protect the instrument components from compression or other such forces that may negatively affect the integrity of the instrument components.

According to examples disclosed herein, the at least one instrument component 400 may include a chromatography instrument component. For example, the instrument component 400 may include a chromatography instrument component for an instrument such as a liquid chromatography instrument. In other examples, the instrument component 400 may include any type of component that may need to be utilized in a sequence that is specific to a machine, an instrument, or an assembly, or for any other purpose associated with the machine, the instrument, or the assembly.

According to examples disclosed herein, as shown in FIG. 4, the front panel 202 of the at least one insert 200 of the plurality of inserts 102 may include a window 208 to permit insertion or removal of the at least one instrument component 400. In some examples, the window 208 may include a perforated opening 402 to permit the insertion or the removal of the at least one instrument component 400.

According to examples disclosed herein, the window 208 may include a transparent layer 210 (e.g., see FIG. 2) for visualization of information 212 associated with the at least one instrument component 400. The information 212 may be printed or otherwise labeled (e.g., by an attachment) onto a package that includes the at least one instrument component 400. In some examples, the information 212 may include identification, installation, removal, maintenance, or any type of information related to the at least one instrument component 400. If the information 212 is labeled (e.g., by an attachment) onto a package that includes the at least one instrument component 400, the label may be removed and attached to the instrument component 400 once the instrument component is removed from the package to maintain identification of the instrument component 400.

According to examples disclosed herein, the window 208 may include a generally quadrilateral configuration. Further, the perforated opening 402 (e.g., see FIG. 4) adjacent to one side of the quadrilateral configuration may permit the insertion or the removal of the at least one instrument component 400.

According to examples disclosed herein, a code 300 (e.g., see FIG. 3) on the front panel 202 and/or the back panel 204 of the at least one in 200 of the plurality of inserts 102 may provide information associated with the at least one instrument component 400. The code 300 may include any type of code, such as a quick response (OR) code, a bar code, or another type of code. A user of the organizer 100 may scan or otherwise utilize the code 300 to view the information associated with the at least one instrument component 400.

According to examples disclosed herein, a visual display 214 on the front panel 202 and/or the back panel 204 of the at least one insert 200 of the plurality of inserts 102 may indicate a position of the at least one instrument component 400 relative to an instrument that utilizes the at least one instrument component 400. In some examples, the visual display 214 may include text, graphical, or other types of information to indicate a position of the at least one instrument component 400 relative to an instrument that utilizes the at least one instrument component 400. For the example of FIG. 2, the visual display 214 may include a depiction of a stack of liquid chromatography instruments 216, another stack of liquid chromatography instruments 218, in which the instrument component 400 is to be installed between the two instrument stacks, and a line 220 that indicates locations of the installment.

Referring to FIG. 1, a front cover 104 and a back cover 106 may at least partially enclose the plurality of inserts 102. In this manner, the front cover 104 and the back cover 106 may protect the instrument components from forces that may negatively affect the integrity of the instrument components. For example, the front cover 104 and the back cover 106 may be formed of a relatively rigid material depending on an intended use of the organizer 100 to protect the instrument components. The rigidity of the inserts 102 may be between 200 $g/m^2$ to 300 $g/m^2$, and preferably approximately 240 $g/m^2$. The front and back covers may be formed of corrugated cardboard that may be covered with a glossy paper.

Referring to FIG. 5, a flap 500 may extend from the front panel 202 or the back panel 204, and is insertable in a slot 502 in the other one of the front panel 202 or the back panel 204 to close the at least one insert 200. The flap 500, when inserted in the slot 502, may securely enclose the instrument components in the insert for secure transport and/or storage by a user of the organizer 100. Instead of or in addition to the flap 500, other closure techniques may be utilized to close the insert 200 to secure the instrument components disposed therein. For example, as shown in FIG. 3, two tongues 302 of the flap 500 may be inserted into corresponding openings 304 provided in the front panel 202. In other examples, the insert 200 may be closed using other techniques such as gluing, folding, and/or stapling.

As shown in FIG. 4, the at least one insert 200 may include a tab 406 to identify and/or index a location of the at least one insert 200 relative to the plurality of inserts 102. The tab 406 may include any type of indicator (e.g., textual, graphical, etc.) to indicate, for example, a position of the insert and/or the instrument component relative to other inserts and/or instrument components. Alternatively or additionally, the tab 406 may identify the instrument component, and the identification may be used in a further process to utilize the instrument component. For example, a user of the organizer 100 may remove the inserts 102 by opening the binding mechanism 206, and thereafter accessing the inserts 102 sequentially based on a numerical or another order according to the indicator on the tabs. Alternatively or additionally, a user of the organizer 100 may leave the inserts 102 in a bound configuration, and access the inserts 102 sequentially based on a numerical or another order according to the indicator on the tabs. Alternatively or additionally, a user of the organizer 100 may generally access the inserts 102 in any order based on the indicator on the tabs.

According to examples disclosed herein, the binding mechanism 206 may attach the plurality of inserts 102 in a specified sequence based on utilization of instrument components disposed in the plurality of inserts 102, a random sequence, or a sequence that is independent of the utilization of the instrument components disposed in the plurality of inserts 102. The specified sequence of the plurality of inserts 102 may be based on a specified utilization order of instrument components in an associated instrument. The random sequence of the plurality of inserts 102 may be based on the need to secure the instrument components in the organizer 100, independent of the utilization order of instrument components in an associated instrument. With respect to the sequence that is independent of the utilization of the instrument components disposed in the plurality of inserts 102, the independent sequence of the plurality of inserts 102 may include, for example, an alphabetical, a numerical, or another such sequence.

Figure 6:
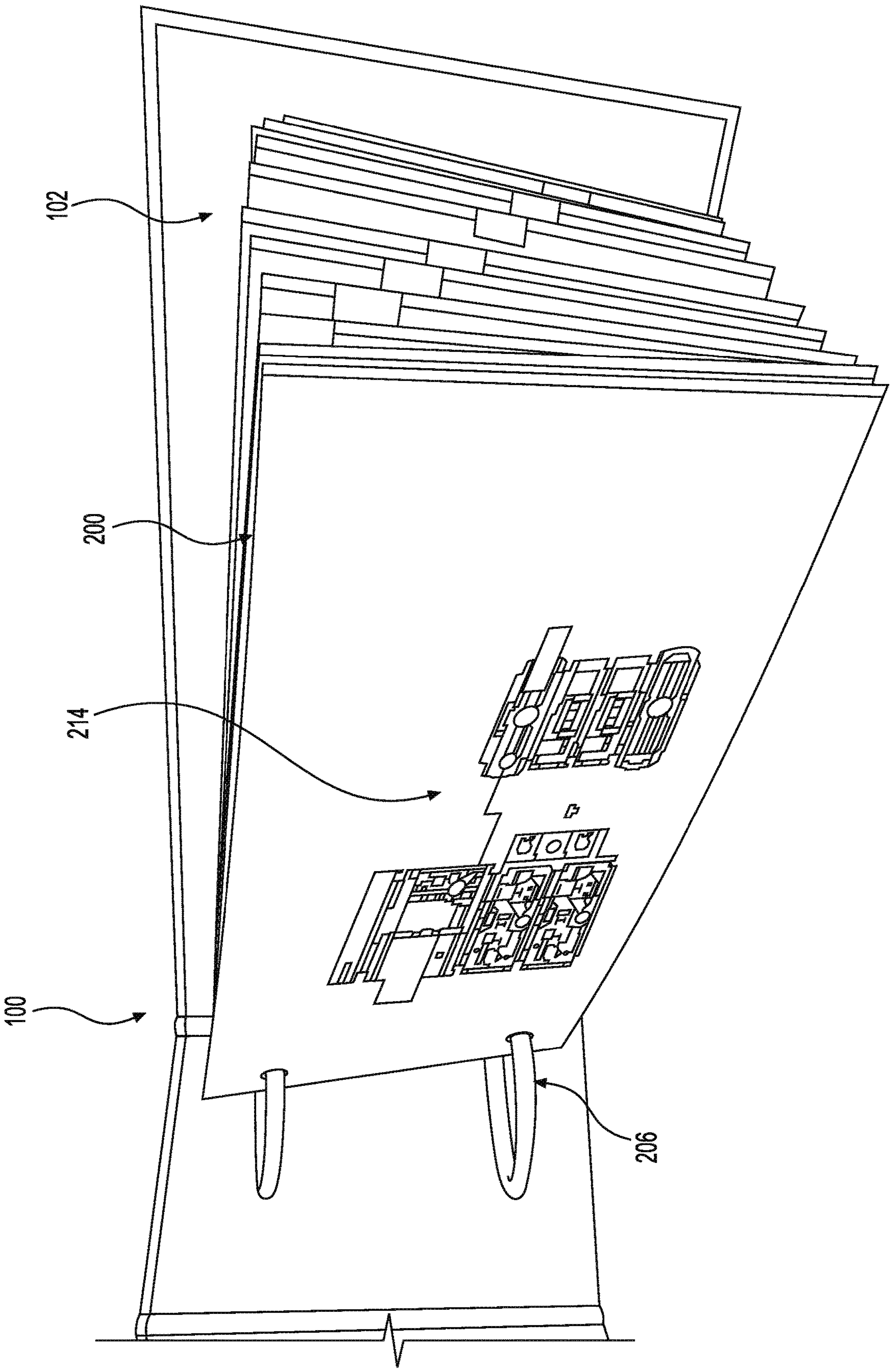
FIG. 6 illustrates a perspective view of the plurality of inserts of the instrument component organizer of FIG. 1, illustrating the inserts in an upright configuration, in accordance with an example of the present disclosure.

FIG. 6 illustrates a perspective view of the plurality of inserts of the organizer 100, illustrating the inserts in an upright configuration, in accordance with an example of the present disclosure.

Referring to FIG. 6, the inserts 102 may be formed of a relatively rigid material depending on an intended use of the organizer 100 to protect the instrument components. In this manner, the inserts 102 may be disposed in an upright configuration as shown in FIG. 6, without the possibility of damage to the instrument components disposed therein. Further, for the example of FIG. 6, the window 208 may be omitted from one or more of the inserts. For example, as shown in FIG. 6, the visual display 214 may be provided on the front panel 202, without the utilization of the window 208. In this manner, the instrument component 400 may be disposed in the insert 200, and not exposed to light or other factors that may affect the instrument component. In other examples, the inserts 102 may include only a visual or textual description (e.g., of the installation process), or may act as separators (e.g., category separators) to structure the installation process, and/or to inform a user that a next section begins. Thus, in some examples, the inserts 102 may not include an instrument component disposed therein.

Figure 7:
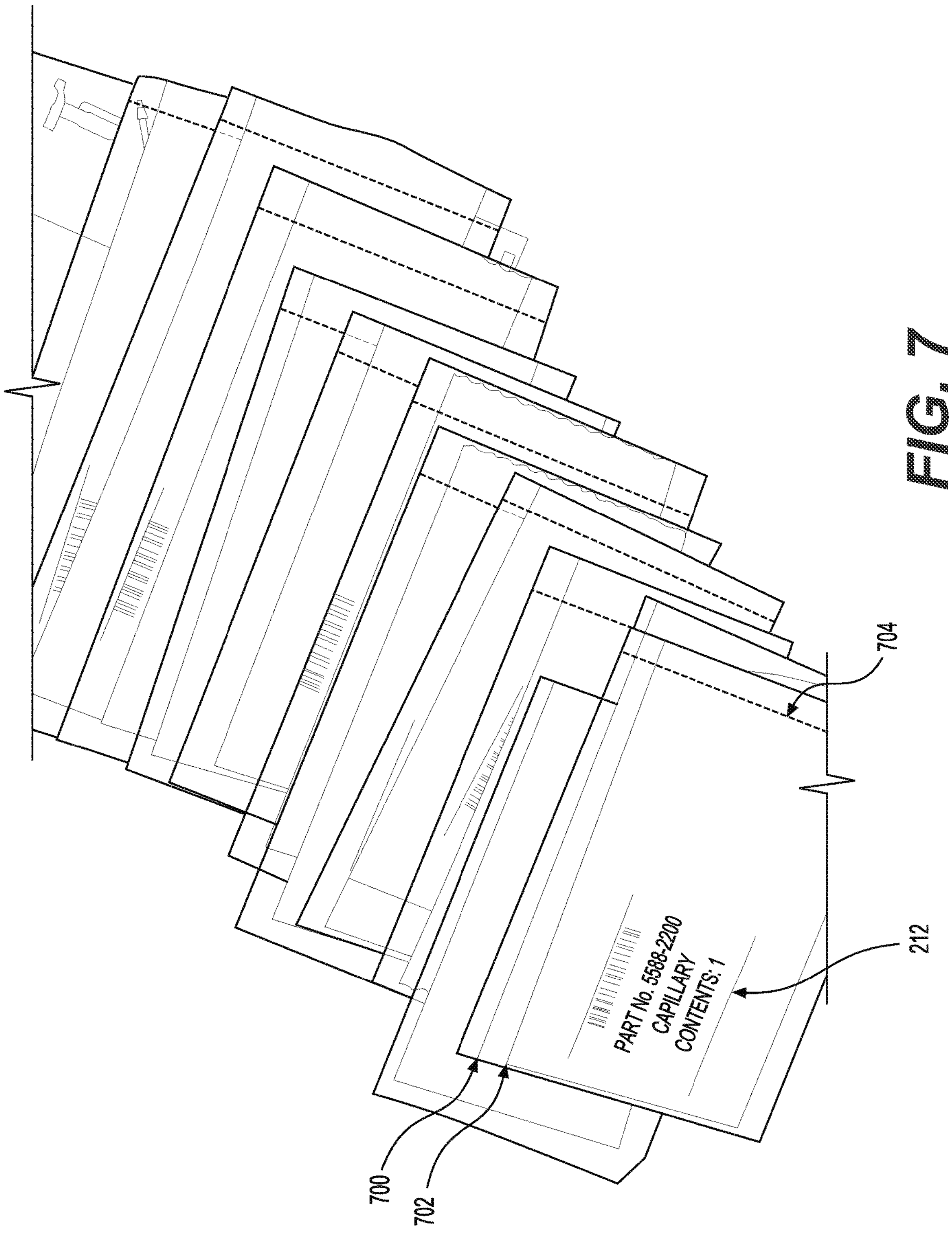
FIG. 7 illustrates a plurality of packages that are to be inserted into inserts of the instrument component organizer of FIG. 1, in accordance with an example of the present disclosure.

FIG. 7 illustrates a plurality of packages that are to be inserted into inserts of the organizer 100, in accordance with an example of the present disclosure.

As shown in FIG. 7, the at least one instrument component 400 may be disposed in a package 700 that is inserted in the at least one insert 200. Each insert, as disclosed herein with reference to FIG. 2, may include information 212 associated with the at least one instrument component 400. The information 212 may be printed or otherwise labeled (e.g., by an attachment) onto package 700 that includes the at least one instrument component 400. In some examples, the information 212 may include identification, installation, removal, maintenance, operation, repair, service contact information, link or (bar-/QR-/other) code to an online shop or online help content (tutorial, step-by-step instructions, etc.) or any type of information related to the at least one instrument component 400. In some examples, the package 700 may be formed of a transparent layer 702 made of plastic or another material to seal the at least one instrument component 400 in a fabric, composite, or another material layer 704. In this manner, the at least one instrument component 400 may be securely disposed in the package 700, before the package 700 is inserted into the insert 200, as well as after the package 700 is removed from the insert 200. Once the package 700 is removed from the insert 200, a user of the organizer 100 may remove the at least one instrument component 400 from the package 700, for example, by tearing or otherwise opening the package 700. Thereafter, the user may follow the instructions specified by the information 212 and/or the visual display 214 on the front panel 202 and/or the back panel 204 of the insert 200.

Figure 8:
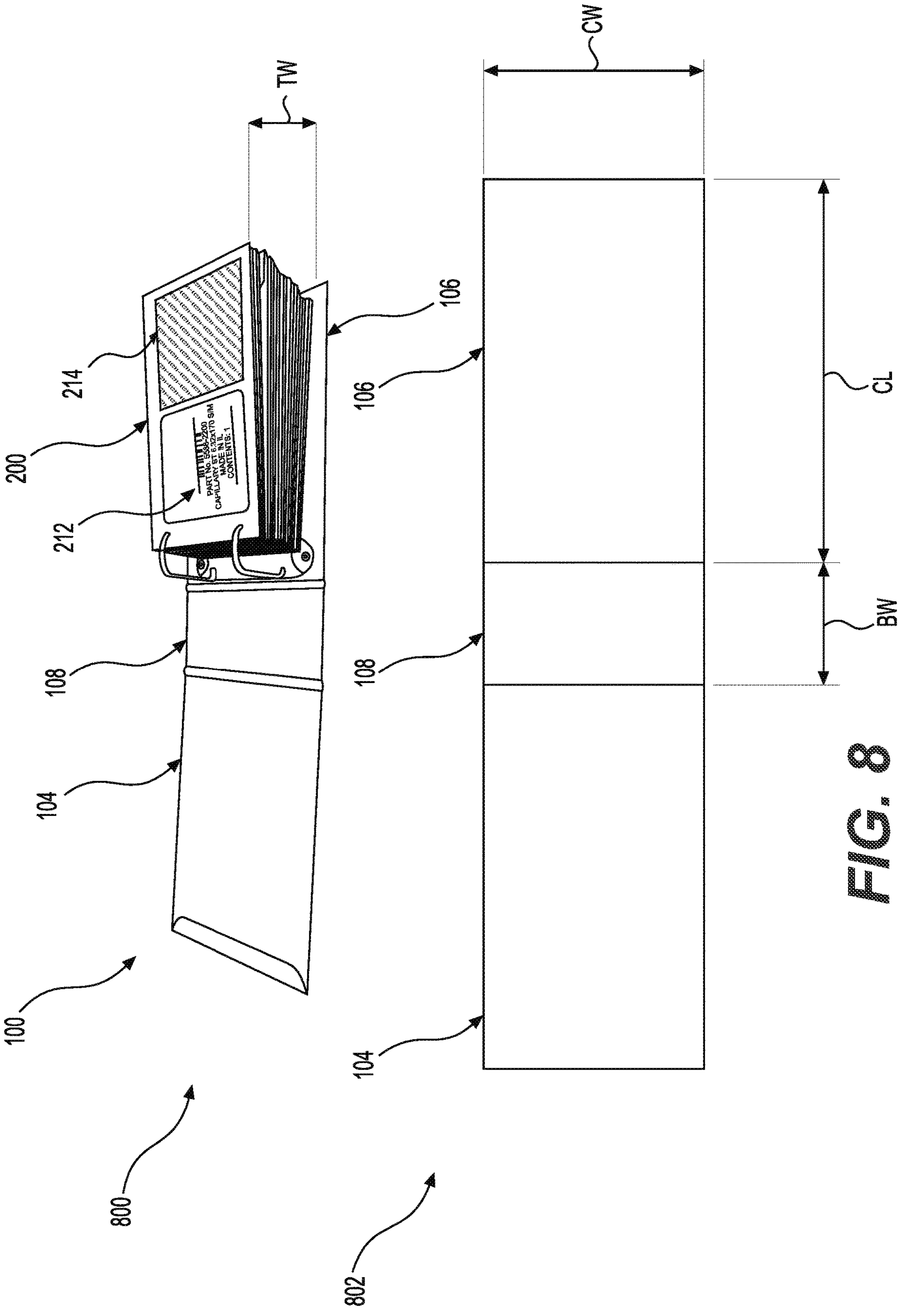
FIG. 8 illustrates a perspective view of the instrument component organizer of FIG. 1 with inserts, and an associated front view of a front cover and a back cover of the instrument component organizer of FIG. 1, in accordance with an example of the present disclosure.

FIG. 8 illustrates a perspective view of the organizer 100, and an associated front view of a front cover and a back cover of the organizer 100, in accordance with an example of the present disclosure.

Referring to FIG. 8, the perspective view 800 of the organizer 100 shows the front cover 104 and the back cover 106 that may at least partially enclose the plurality of inserts 102. Further, the front view 802 shows the front cover 104 and the back cover 106 of the organizer 100 in an open configuration. The front cover 104 and the back cover 106 may include a length CL and a width CW that is greater than a length IL and a width IW (e.g., see FIG. 9) of the insert 200. For example, the length CL and the width CW may be specified as being 10% greater than the length IL and the width IW. The value of 10% (or another value) may be determined, for example, based on a type of the instrument component 400 disposed in the insert, with the value being increased to prevent damage to the instrument component 400 during storage and/or transport of the organizer 100.

The perspective view 800 and the front view 802 show that the binding mechanism 206 may include the spine 108 that includes a width BW that is greater than or equal to a maximum thickness TW of the plurality of inserts 102 including instrument components that include the at least one instrument component. For example, the width BW may be specified as being 15% greater than the maximum thickness TW. The value of 15% (or another value) may be determined, for example, based on a type of the instrument component 400 disposed in the insert, with the value being increased to prevent damage to the instrument component 400 during storage and/or transport of the organizer 100.

Figure 9:
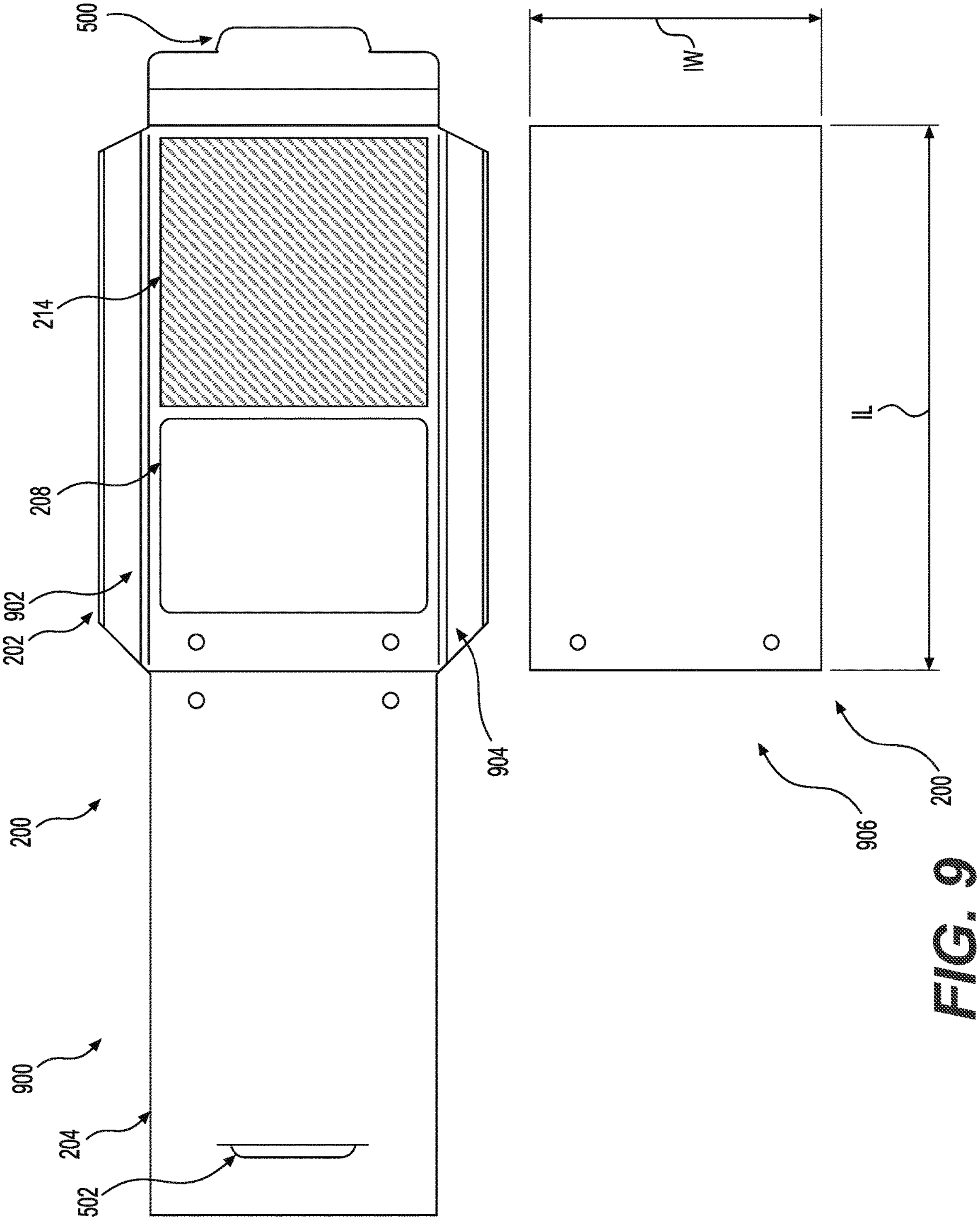
FIG. 9 illustrates a front view of an insert in an open configuration and a closed configuration, in accordance with an example of the present disclosure.

FIG. 9 illustrates a front view of an insert in an open configuration and a closed configuration, in accordance with an example of the present disclosure.

Referring to FIG. 9, for the open configuration of the insert 200 as shown at 900, the flap 500 may extend from the front panel 202 or the back panel 204, and is insertable hi the slot 502 in the other one of the front panel 202 or the back panel 204 to close the at least one insert 200. The insert 200 may further include an upper fold 902 and a lower fold 904 in the orientation of FIG. 9. The upper and lower folds may include an adhesive layer that may be exposed (e.g., by removing a cover layer) to permit attachment of the upper fold 902 and the lower fold 904 of the front panel 202 to the opposite back panel 204. Once the upper fold 902 and the lower fold 904 of the front panel 202 are folded and attached to the opposite back panel 204, the flap 500 may be inserted in the slot 502 to close the at least one insert 200.

For the closed configuration of the insert 200 as shown at 906, the insert 200 may include a generally rectangular configuration. Alternatively or additionally, the insert 200 may include any type of configuration, such as a square, circular, oval, or another shape based, for example, on the configuration of the instrument component 400 disposed in the insert.

Figure 10:
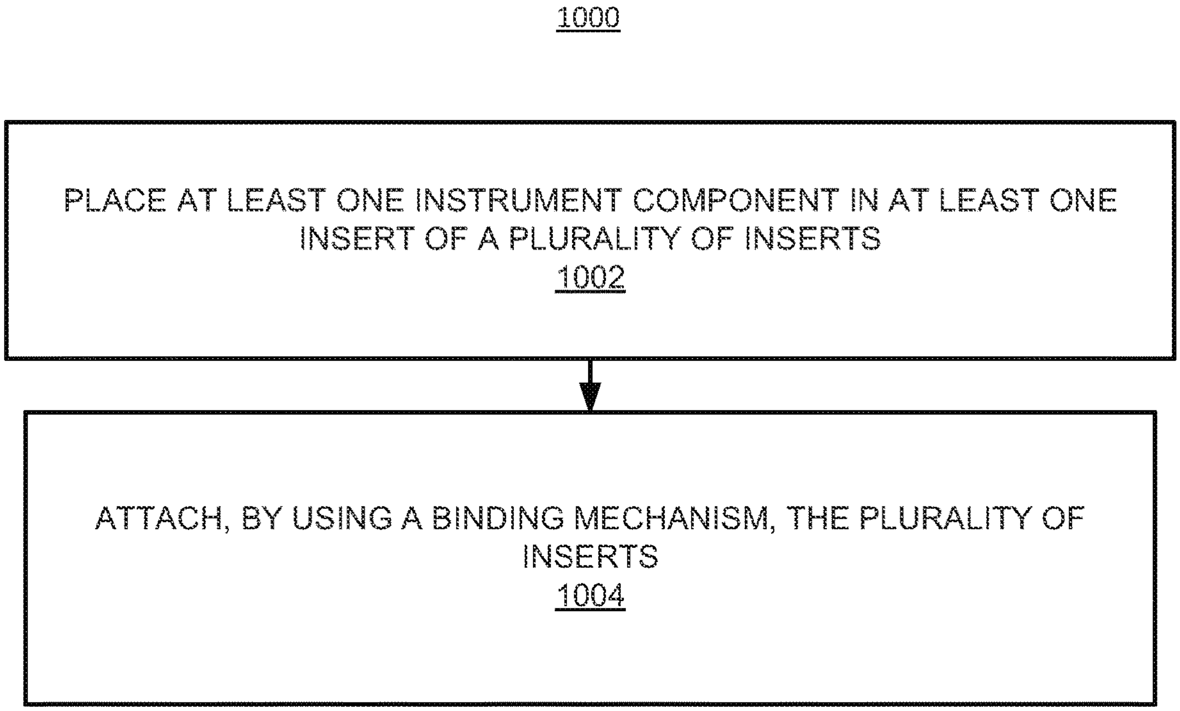
FIG. 10 illustrates a flowchart of an example method of forming the instrument component organizer of FIG. 1, in accordance with an example of the present disclosure.

FIG. 10 illustrates a flowchart of an example method 1000 of forming the organizer 100, in accordance with an example of the present disclosure.

Referring to FIGS. 1-10, and particularly FIG. 10, at block 1002, the method 1000 may include placing at least one instrument component 400 in at least one insert 200 of a plurality of inserts 102, for example, by inserting the at least one instrument component 400 in window 208 of the at least one insert 200 of the plurality of inserts 102. The at least one insert 200 may include at least a front panel 202 and an opposite back panel 204 that form the at least one insert 200.

At block 1004, the method 1000 may further include forming an organizer by attaching, by using a binding mechanism 206, the plurality of inserts.

The method 1000 may also include placing a visual display 214 on the front panel 202 of the at least one insert 200 of the plurality of inserts 102 to provide a position of the at least one instrument component 400 relative to an instrument that utilizes the at least one instrument component 400.

Figure 11:
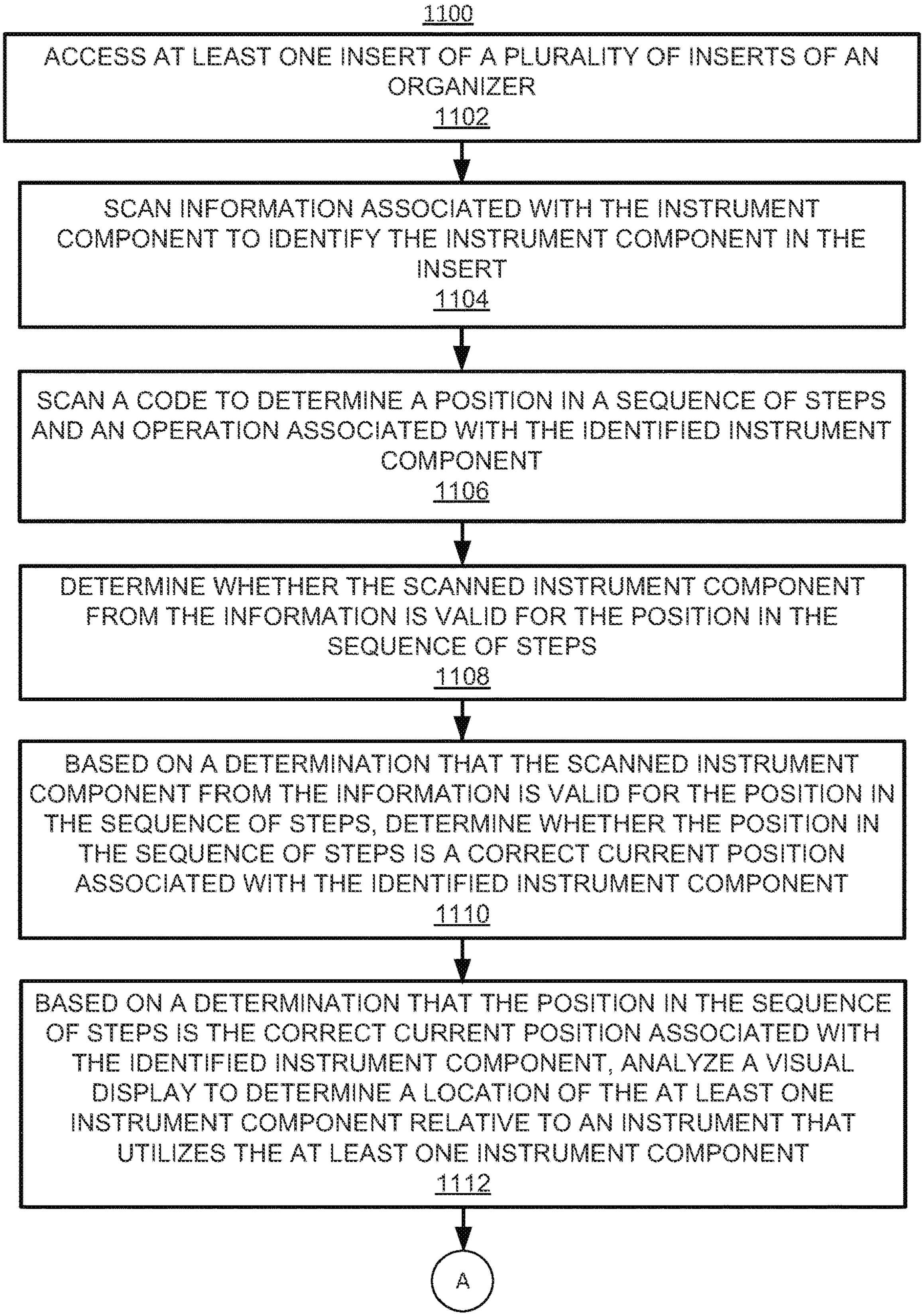
FIG. 11 illustrates a flowchart of an example method of utilizing the instrument component organizer of FIG. 1, in accordance with an example of the present disclosure.
Figure 11:
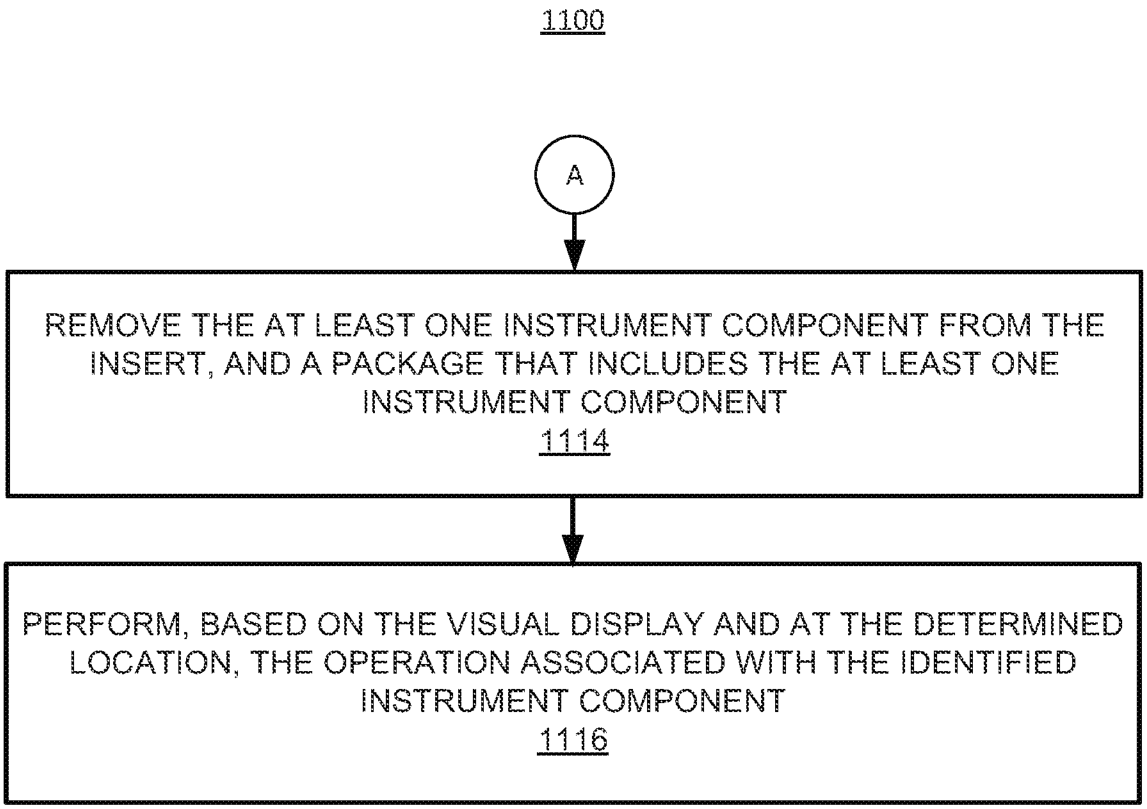

FIG. 11 illustrates a flowchart of an example method 1100 of utilizing the organizer 100, in accordance with an example of the present disclosure. One or more of the steps recited in the method 1100 may be performed in a different order, and/or may be eliminated or combined with other steps of the method 1100.

Referring to FIGS. 1-9 and 11, and particularly FIG. 11, at block 1102, the method 1100 may include accessing at least one insert of a plurality of inserts 102 of an organizer 100. For example, the accessed insert may be a first insert of the organizer 100 that includes twelve (12) inserts 102.

At block 1104, the method 1100 may include scanning the information 212 associated with the instrument component 400 to identify the instrument component 400 in the insert. In this regard, the information 212 may include a bar code that may be scanned.

At block 1106, the method 1100 may include scanning the code 300 to determine a position in a sequence of steps and an operation associated with the identified instrument component 400 (e.g., from block 1104). For example, the sequence of steps may include steps 1-12 for replacing twelve (12) capillaries of a liquid chromatography instrument. In some examples, the code 300 may also include the information 212, in which case step 1104 may be omitted.

At block 1108, the method 1100 may include determining whether that the scanned instrument component from the information 212 is valid for the position in the sequence of steps.

At block 1110, based on a determination that the scanned instrument component from the information 212 is valid for the position in the sequence of steps, the method 1100 may include determining whether the position in the sequence of steps is a correct current position associated with the identified instrument component 400. For example, for the sequence of steps that include steps 1-12 for replacing twelve (12) capillaries of a liquid chromatography instrument, the identified instrument component 400 of the first insert may correspond to step 1 of steps 1-12.

At block 1112, based on a determination that the position in the sequence of steps is the correct current position associated with the identified instrument component 400, the method 1100 may include analyzing the visual display 214 to determine a location of the at least one instrument component 400 relative to an instrument that utilizes the at least one instrument component 400. For example, a user of the organizer 100 may analyze the visual display 214 to determine a location of the at least one instrument component 400 relative to an instrument that utilizes the at least one instrument component 400. Alternatively or additionally, for automated performance of the operation associated with the identified instrument component 400, a robotic tool may analyze, for example, by scanning, the visual display 214 to determine a location of the at least one instrument component 400 relative to an instrument that utilizes the at least one instrument component 400. Yet further, for guided performance of the operation associated with the identified instrument component 400, for example, when using mixed reality tools (e.g., mixed reality goggles etc.), the information 212, the visual display 214, and/or the code 300 may be automatically read in, understood and interpreted. In this regard, a user, when utilizing the mixed reality tool, may look at the organizer 100, and the steps disclosed herein may be shown in a mixed reality environment, along with the correct instrument (e.g., highlighted in a certain color), the correct location for the instrument component, and/or installation videos associated with the instrument component.

At block 1114, the method 1100 may include removing the at least one instrument component 400 from the insert, and the package 700 that includes the at least one instrument component 400. For example, the user of the organizer 100 may remove the at least one instrument component 400 from the insert, and the package 700 that includes the at least one instrument component 400. As disclosed herein, if the information 212 is labeled (e.g., by an attachment) onto a package that includes the at least one instrument component 400, the label may be removed and attached to the instrument component 400 once the instrument component is removed from the package to maintain identification of the instrument component 400. Alternatively or additionally, for automated performance of the operation associated with the identified instrument component 400, the robotic tool may remove the at least one instrument component 400 from the insert, and the package 700 that includes the at least one instrument component 400.

At block 1116, the method 1100 may include performing, based on the visual display 214 and at the determined location, the operation associated with the identified instrument component 400. For example, the user of the organizer 100 may perform, based on the visual display 214 and at the determined location, the operation associated with the identified instrument component 400. Alternatively or additionally, for automated performance of the operation associated with the identified instrument component 400, the robotic tool may perform, based on the visual display 214 and at the determined location, the operation associated with the identified instrument component 400.

With respect to FIG. 11, for the example of the method 1100 of utilizing the organizer 100. In some cases, a user may proceed to block 1112 and immediately install the instrument component 400 without accounting for the correct position hi the sequence of steps. In other examples where a mixed-reality tool is utilized, the aforementioned verification for blocks 1108 and 1110 may be performed in the background without user notification. In yet further examples associated with utilization of mixed-reality tools, a user of the organizer 100 may remove all of the inserts 102 from the organizer 100, place the inserts 102 on a surface where the information 212, the visual display 214, and/or the code 300 may be scanned by the mixed-reality tool, and a first instrument component in a sequence of steps may be identified and highlighted for utilization. In this regard, the user may scan a single barcode, for example, at the beginning of the organizer 100, and thereafter, the user may be prompted to lay all inserts on a surface to scan the information 212 on all of the inserts, without the need to scan the visual display 214, and/or the code 300. Once an instrument component is installed, the mixed reality tool or a software may guide the user immediately to the next instrument component and process step.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An organizer comprising:
- a plurality of inserts, wherein at least one insert of the plurality of inserts includes
  - at least a front panel and an opposite back panel that form the at least one insert, and
  - at least one instrument component disposed in the at least one insert; and
- a binding mechanism that attaches the plurality of inserts,
- wherein the front panel of the at least one insert of the plurality of inserts includes a window to permit insertion or removal of the at least one instrument component, wherein a length and a width of the window is smaller than a length and a width of the front panel, and
- wherein the window includes:
  - a generally quadrilateral configuration; and
  - an opening adjacent to one side of the quadrilateral configuration to permit the insertion or the removal of the at least one instrument component.

2. The organizer according to claim 1, wherein the at least one instrument component includes a chromatography instrument component.

3. The organizer according to claim 1, wherein the window includes a perforated opening to permit the insertion or the removal of the at least one instrument component.

4. The organizer according to claim 1, wherein the window includes a transparent layer for visualization of information associated with the at least one instrument component.

5. The organizer according to claim 1, wherein the binding mechanism includes at least one ring that attaches the plurality of inserts.

6. The organizer according to claim 1, further comprising:
- a code on at least one of the front panel or the back panel of the at least one insert of the plurality of inserts to provide information associated with the at least one instrument component.

7. The organizer according to claim 1, further comprising:
- a visual display on at least one of the front panel or the back panel of the at least one insert of the plurality of inserts to indicate a position of the at least one instrument component relative to an instrument that utilizes the at least one instrument component.

8. The organizer according to claim 1, further comprising:
- a front cover and a back cover to at least partially enclose the plurality of inserts.

9. The organizer according to claim 1, wherein the binding mechanism includes a spine that includes a width that is greater than or equal to a maximum thickness of the plurality of inserts including instrument components that include the at least one instrument component.

10. The organizer according to claim 1, further comprising:
- a flap extending from the front panel or the back panel and insertable in a slot in the other one of the front panel or the back panel to close the at least one insert.

11. The organizer according to claim 1, wherein the at least one instrument component is disposed in a package that is inserted in the at least one insert.

12. The organizer according to claim 1, wherein the at least one insert includes a tab to identify a location of the at least one insert relative to the plurality of inserts.

13. The organizer according to claim 1, wherein the binding mechanism attaches the plurality of inserts in
- a specified sequence based on utilization of instrument components disposed in the plurality of inserts,
- a random sequence, or
- a sequence that is independent of the utilization of the instrument components disposed in the plurality of inserts.

14. An organizer comprising:
- a plurality of inserts, wherein each insert of the plurality of inserts is formed in a shape of an enclosure;
- at least one device disposed in at least one insert of the plurality of inserts;
- a binding mechanism that attaches the plurality of inserts; and
- a flap extending from a panel of the at least one insert of the plurality of inserts and insertable in a slot in another panel of the at least one insert of the plurality of inserts to close the at least one insert of the plurality of inserts, wherein the slot is cut within the other panel.

* * * * *